No. 887,653. PATENTED MAY 12, 1908.
G. L. KLINE.
PLANT SUPPORT.
APPLICATION FILED OCT. 17, 1907.
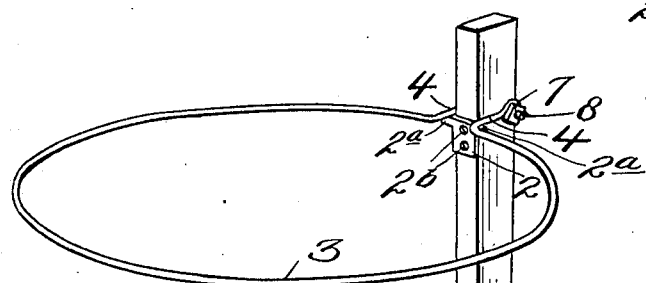
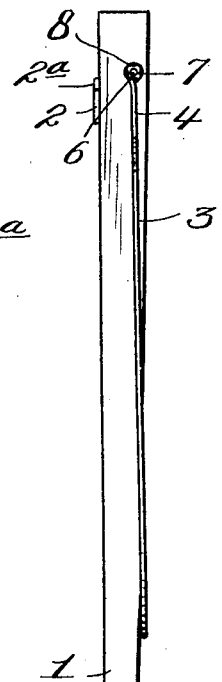
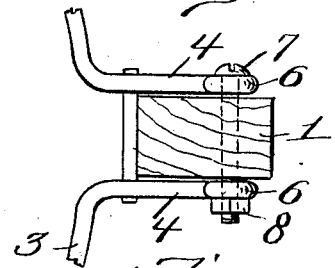
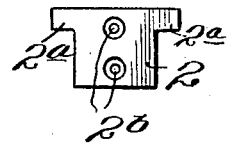
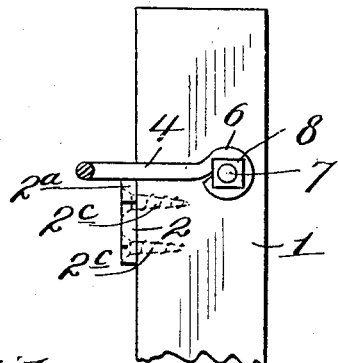
Witnesses:
Inventor
George L. Kline
By James L. Norris
Atty.

UNITED STATES PATENT OFFICE.

GEORGE L. KLINE, OF WARREN, PENNSYLVANIA.

PLANT-SUPPORT.

No. 887,653.   Specification of Letters Patent.   Patented May 12, 1908.

Application filed October 17, 1907. Serial No. 397,841.

*To all whom it may concern:*

Be it known that I, GEORGE L. KLINE, a citizen of the United States, residing at Warren, in the county of Warren and State of Pennsylvania, have invented new and useful Improvements in Plant-Supports, of which the following is a specification.

This invention relates to a support for plants, shrubs and young trees; and the object thereof is to provide a support in a manner as hereinafter set forth particularly adapted for retaining a tree, plant or shrub in an upright position during a storm or when growing, as it is necessary to support them in an upright position so that the weight thereof will not break the stems or cause them to lie upon the ground.

Further objects of the invention are to provide a support for the purpose set forth which shall be simple in its construction, convenient and efficient in use, strong, durable and comparatively inexpensive to manufacture.

With the foregoing and other objects in view, the invention consists in the novel combination, construction and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In describing the invention in detail reference is had to the accompanying drawings wherein like characters denote corresponding parts throughout the several views, and in which—

Figure 1 is a perspective view of a plant support in accordance with this invention, showing the same in position for use; Fig. 2 is a like view showing the hoop arranged in a depending position; Fig. 3 is a sectional detail; Fig. 4 is a side view broken away, and Fig. 5 is a view of the seat-forming member.

Referring to the drawings in detail the numeral 1 denotes an upright support in the form of a tapering stake provided near its top with a seat-forming member consisting of a plate 2 having a pair of laterally-extending protuberances $2^a$ and formed with openings $2^b$ through which are adapted to extend holdfast devices $2^c$ for securing the plate 2 to the upper portion of the stake 1.

The reference character 3 denotes the retaining hoop for the plant which is provided with a pair of arms 4 each of which has its free end terminating in an eye 6. The arms 4 are arranged at each side of the upright 1 and extending through the eyes 6 and the said upright is a screw-threaded bolt 7 carrying the nut 8. The bolt 7 and nut 8 pivotally connect the retaining hoop 3 to the upright 1. Only one hoop is shown, but it is evident that as many hoops can be connected to the upright 1 as is desired. The arms 4 when the hoop 3 is in the position shown in Fig. 3 rests upon the protuberances $2^a$, such arrangement maintaining the hoop 3 in a position at right angles to the upright 1, which is the operative position of the hoop or hoops when surrounding a plant or plants to keep the same in an upright position. The hoop 3 is connected to the upright 1 in such a manner that it can be swung rearwardly and assume the position shown in Fig. 2 when the plant support is not desired for use.

A plant support in accordance with this invention is very simple and durable in construction, can be cheaply manufactured and readily applied so that the stems of the plants may have a complete free and unhindered passage and without interfering with the natural growth of the plant.

What I claim is—

1. A plant support comprising a stake, a hoop provided with a pair of arms, means extending through the arms for pivotally and detachably connecting the hoop to the stake, and a plate secured to the stake and provided with a pair of lateral protuberances constituting a seat for the arms whereby said hoop is maintained at right angles with respect to the stake.

2. A plant support comprising a stake, a hoop provided with a pair of arms, one positioned at each side of the stake, each of said arms provided at one end with an eye, means extending through the stake and eyes for pivotally connecting the arms to the stake, and a plate secured to the front of the stake and provided with a pair of lateral protuberances constituting seats for the arms whereby said hoop is maintained at right angles with respect to the stake.

3. A plant support comprising a tapering stake, a hoop provided with a pair of arms, one positioned at each side of the stake, each of said arms provided at one end with an eye, a headed bolt extending through the stake and eyes for pivotally connecting the arms to the stake, a nut mounted upon one end of the bolt for connecting it to the stake, and a plate secured to the stake and provided at its top with a pair of lateral protuberances constituting seats for the arms whereby the hoop is maintained at right angles with respect to the stake.

In testimony whereof I have hereunto set my hand in presence of two subscribing witnesses.

GEORGE L. KLINE.

Witnesses:
 GODFREY KOEBLEY,
 WILL KOEBLEY.